United States Patent
Lundberg et al.

(10) Patent No.: US 8,942,901 B2
(45) Date of Patent: Jan. 27, 2015

(54) METHOD OF CONTROLLING A HYDRAULIC CONTROL SYSTEM FOR A DUAL CLUTCH TRANSMISSION

(75) Inventors: Philip C. Lundberg, Keego Harbor, MI (US); Bret M. Olson, Whitelake, MI (US); Brian W. Whitmarsh, Commerce, MI (US); Wayne B. Vogel, Canton, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 417 days.

(21) Appl. No.: 13/252,762

(22) Filed: Oct. 4, 2011

(65) Prior Publication Data
US 2012/0144946 A1 Jun. 14, 2012

Related U.S. Application Data

(60) Provisional application No. 61/421,526, filed on Dec. 9, 2010.

(51) Int. Cl.
*B60W 10/02* (2006.01)
*F16H 61/688* (2006.01)
*F16H 61/02* (2006.01)
*F16H 61/28* (2006.01)

(52) U.S. Cl.
CPC .......... *F16H 61/688* (2013.01); *F16H 61/0251* (2013.01); *F16H 61/2807* (2013.01); *F16H 2061/0258* (2013.01)
USPC ................................ 701/68; 477/168; 74/339

(58) Field of Classification Search
USPC ...................... 477/77, 79, 166, 168; 192/3.54; 74/473.11; 701/67, 68
See application file for complete search history.

(56) References Cited

U.S. PATENT DOCUMENTS

| | | | |
|---|---|---|---|
| 3,834,499 A | 9/1974 | Candellero et al. |
| 4,653,352 A | 3/1987 | Nakao et al. |
| 4,924,983 A | 5/1990 | Katayama et al. |
| 4,944,202 A | 7/1990 | Gierer |
| 5,441,459 A | 8/1995 | Inukai et al. |
| 5,992,590 A | 11/1999 | Harries |
| 6,631,651 B2 | 10/2003 | Petrzik |
| 6,715,597 B1 | 4/2004 | Buchanan |
| 6,789,658 B2 | 9/2004 | Busold et al. |
| 6,827,191 B2 | 12/2004 | Kuhstrebe |
| 6,883,394 B2 | 4/2005 | Koenig et al. |
| 6,909,955 B2 | 6/2005 | Vukovich |
| 7,300,375 B2 | 11/2007 | Petrzik |

(Continued)

FOREIGN PATENT DOCUMENTS

| | | |
|---|---|---|
| DE | 2141564 A1 | 2/1973 |
| DE | 4027508 A1 | 3/1991 |

(Continued)

*Primary Examiner* — David D Le
*Assistant Examiner* — Stacey Fluhart

(57) ABSTRACT

A hydraulic control system for a dual clutch transmission includes a plurality of solenoids and valves in fluid communication with a plurality of clutch actuators and with a plurality of synchronizer actuators. The clutch actuators are operable to actuate a plurality of torque transmitting devices and the synchronizer actuators are operable to actuate a plurality of synchronizer assemblies. Selective activation of combinations of the solenoids allows for a pressurized fluid to activate at least one of the clutch actuators and synchronizer actuators in order to shift the transmission into a desired gear ratio.

18 Claims, 7 Drawing Sheets

(56) References Cited

U.S. PATENT DOCUMENTS

| | | | |
|---|---|---|---|
| 7,401,689 | B2 | 7/2008 | Hegerath et al. |
| 7,410,438 | B2 * | 8/2008 | Moehlmann et al. ......... 475/116 |
| 7,464,618 | B2 * | 12/2008 | Mohlmann et al. ............. 74/346 |
| 7,487,866 | B2 | 2/2009 | Kruse et al. |
| 2001/0036878 | A1 | 11/2001 | Itou et al. |
| 2002/0060113 | A1 | 5/2002 | Harries |
| 2002/0119864 | A1 | 8/2002 | Harries |
| 2003/0075408 | A1 | 4/2003 | Alfredsson |
| 2004/0038765 | A1 | 2/2004 | Fujimine et al. |
| 2005/0067251 | A1 | 3/2005 | Bradford, Jr. et al. |
| 2005/0107214 | A1 | 5/2005 | Koenig |
| 2006/0005647 | A1 * | 1/2006 | Braford et al. .................. 74/335 |
| 2007/0175726 | A1 | 8/2007 | Combes et al. |
| 2008/0207392 | A1 | 8/2008 | Staudinger et al. |
| 2008/0210032 | A1 | 9/2008 | Uberti et al. |
| 2008/0223683 | A1 | 9/2008 | Grethel |
| 2009/0000897 | A1 | 1/2009 | Staudinger et al. |
| 2009/0151495 | A1 | 6/2009 | Garabello et al. |
| 2009/0157271 | A1 | 6/2009 | Garabello et al. |

FOREIGN PATENT DOCUMENTS

| | | |
|---|---|---|
| DE | 4117736 C1 | 5/1992 |
| DE | 4128389 A1 | 3/1993 |
| DE | 4320353 A1 | 1/1994 |
| DE | 19538808 A1 | 5/1996 |
| DE | 19637001 A1 | 3/1997 |
| DE | 29714652 U1 | 10/1997 |
| DE | 19813982 A1 | 10/1999 |
| DE | 19921301 A1 | 11/1999 |
| DE | 19849488 A1 | 5/2000 |
| DE | 19857222 A1 | 6/2000 |
| DE | 19931973 A1 | 1/2001 |
| DE | 10020187 A1 | 10/2001 |
| DE | 10147123 A1 | 4/2002 |
| DE | 10125172 A1 | 11/2002 |
| DE | 10134115 A1 | 1/2003 |
| DE | 10250733 A1 | 6/2003 |
| DE | 10243282 A1 | 4/2004 |
| DE | 10327406 A1 | 2/2005 |
| DE | 10343992 A1 | 4/2005 |
| DE | 10349841 A1 | 5/2005 |
| DE | 102004001753 A1 | 8/2005 |
| DE | 102005006431 A1 | 8/2006 |
| DE | 102005029962 A1 | 1/2007 |
| DE | 102005029967 A1 | 1/2007 |
| DE | 102005029963 A1 | 2/2007 |
| DE | 102005029964 A1 | 3/2007 |
| DE | 102008008454 A1 | 9/2008 |
| DE | 102008058692 A1 | 6/2009 |
| EP | 0157086 A1 | 10/1985 |
| EP | 0212182 A1 | 3/1987 |
| EP | 0475488 A1 | 3/1992 |
| EP | 0477564 A2 | 4/1992 |
| EP | 0933564 A2 | 8/1999 |
| EP | 0976952 A1 | 2/2000 |
| EP | 1059470 A1 | 12/2000 |
| EP | 1400733 A2 | 3/2004 |
| EP | 1469235 A1 | 10/2004 |
| EP | 1519082 A1 | 3/2005 |
| EP | 1589262 A1 | 10/2005 |
| EP | 1645786 A2 | 4/2006 |
| EP | 1767824 A1 | 3/2007 |
| EP | 2151586 A2 | 2/2010 |
| FR | 2808065 A1 | 10/2001 |
| JP | 2007010145 A | 1/2007 |
| WO | WO9705410 A1 | 2/1997 |
| WO | WO2004097265 | 11/2004 |
| WO | WO2009037170 A1 | 3/2009 |
| WO | WO2010028745 A2 | 3/2010 |

* cited by examiner

METHOD OF CONTROLLING A HYDRAULIC CONTROL SYSTEM FOR A DUAL CLUTCH TRANSMISSION

CROSS-REFERENCE TO RELATED APPLICATIONS

This application claims the benefit of U.S. Provisional Application No. 61/421,526 filed on Dec. 9, 2010. The disclosure of the above application is incorporated herein by reference.

TECHNICAL FIELD

The invention relates to a method of controlling a control system for a dual clutch transmission, and more particularly to a method of controlling an electro-hydraulic control system having a plurality of solenoids and valves operable to actuate a plurality of actuators within the dual clutch transmission.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Typically an electronically controlled hydraulic control circuit or system is employed to control solenoids and valve assemblies. The solenoid and valve assemblies actuate clutches and synchronizers to achieve the forward and reverse gear ratios.

While previous hydraulic control systems are useful for their intended purpose, the need for new and improved hydraulic control system configurations within transmissions that exhibit improved performance, especially from the standpoints of increased fuel economy and safety, is essentially constant. Accordingly, there is a need for an improved, cost-effective hydraulic control system for use in a dual clutch transmission.

SUMMARY

A method for controlling a hydraulic control system for a dual clutch transmission includes a plurality of solenoids and valves in fluid communication with a plurality of clutch actuators and with a plurality of synchronizer actuators. The clutch actuators are operable to actuate a plurality of torque transmitting devices and the synchronizer actuators are operable to actuate a plurality of synchronizer assemblies. Selective activation of combinations of the solenoids allows for a pressurized fluid to activate at least one of the clutch actuators and synchronizer actuators in order to shift the transmission into a desired gear ratio.

In one aspect of the present invention, the hydraulic control system includes an electric pump and an accumulator that provide a pressurized hydraulic fluid.

In another aspect of the present invention, the hydraulic control system includes four variable force solenoids in communication with an electric pump and an accumulator.

In yet another aspect of the present invention, the hydraulic control system includes four variable force solenoids in communication with the electric pump and the accumulator, two variable force solenoids or variable flow solenoids in communication with two clutch actuating devices, and two on/off solenoids in communication with three logic valve assemblies.

In yet another aspect of the present invention, the hydraulic control system includes a supply valve in communication with the on/off solenoids.

In yet another aspect of the present invention, a hydraulic control system for controlling a dual clutch transmission is provided. The hydraulic control system includes a source of pressurized hydraulic fluid, a first, a second, a third and a fourth variable force solenoids, a first flow control solenoid, a second flow control solenoid, a first clutch actuator, a second clutch actuator, a first, second and third logic valve assembly and four synchronizer actuators. The four variable force solenoids are pressure control solenoids in one embodiment of the present invention and flow control solenoids in another embodiment of the present invention depending on the hydraulic control system requirements.

The first, second, third and fourth variable force solenoids are in downstream fluid communication with the source of pressurized hydraulic fluid. The first flow control solenoid is in downstream fluid communication with the first variable force control solenoid. The second flow control solenoid is in downstream fluid communication with the second pressure control solenoid. The first clutch actuator is in downstream fluid communication with the first flow control solenoid for selectively actuating a first clutch of the dual clutch transmission. The second clutch actuator is in downstream fluid communication with the second flow control solenoid for selectively actuating a second clutch of the dual clutch transmission. The first logic valve assembly is in downstream fluid communication with the third and the fourth variable force solenoid. The first logic control valve assembly has a valve movable between a first and a second position. The second logic valve assembly is in downstream fluid communication with the first logic valve assembly. The second logic control valve assembly has a valve movable between a first and a second position. The third logic valve assembly is in downstream fluid communication with the first logic valve assembly. The third logic control valve assembly has a valve movable between a first and a second position. The first actuator is in downstream fluid communication with the second logic valve assembly. The first actuator is movable between a first and second position when the valve of the first logic control valve assembly is in the first position and the valve of the second logic control valve assembly is in the first position. The second actuator is in downstream fluid communication with the second logic valve assembly. The second actuator is movable between a first and second position when the valve of the first logic control valve assembly is in the first position and the valve of second logic control valve assembly is in the second position. The third actuator is in downstream fluid communication with the third logic valve assembly. The third actuator is movable between a first and second position when the valve of the first logic control valve assembly is in the second position and the valve of third logic control valve assembly is in the first position. The fourth actuator is in downstream fluid communication with the third logic valve assembly. The fourth actuator is movable between a first and second position when the valve of the first logic control valve assembly is in the second position and the valve of third logic control valve assembly is in the second position. The third variable force solenoid generates a first hydraulic fluid pressure to move at least one of the four actuators into the first position and the fourth variable force solenoid generates a second hydraulic fluid pressure to move the at least one of the four actuators into the second position.

Further aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
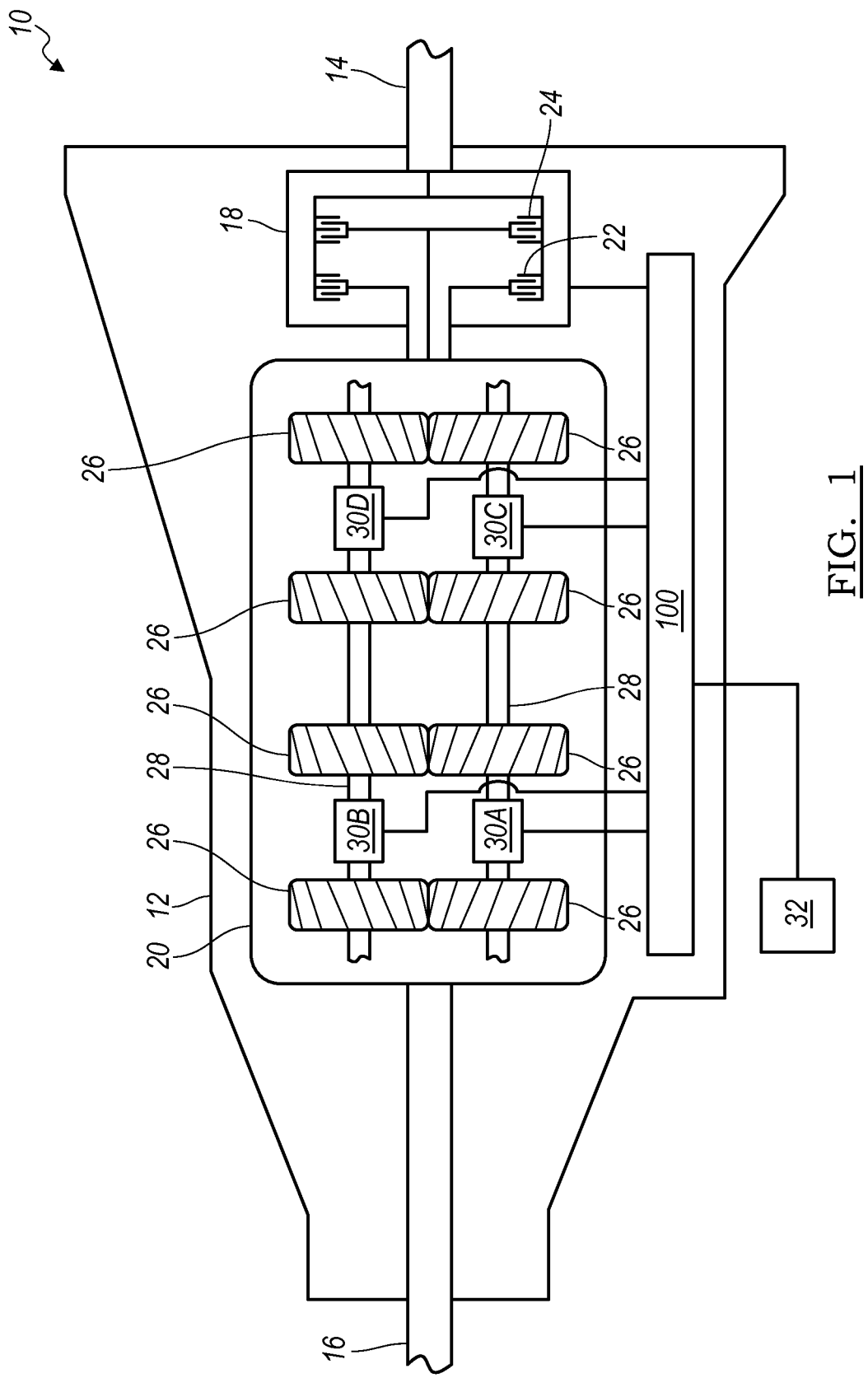
FIG. 1 is a schematic diagram of an exemplary dual clutch automatic transmission incorporating a hydraulic control system according to the principles of the present invention.

With reference to FIG. 1, an exemplary dual clutch automatic transmission incorporating the present invention is illustrated and generally designated by the reference number 10. The dual clutch transmission 10 includes a typically cast metal housing 12 which encloses and protects the various components of the transmission 10. The housing 12 includes a variety of apertures, passageways, shoulders and flanges which position and support these components. The transmission 10 includes an input shaft 14, an output shaft 16, a dual clutch assembly 18, and a gear arrangement 20. The input shaft 14 is connected with a prime mover (not shown) such as an internal combustion gas or Diesel engine or a hybrid power plant. The input shaft 14 receives input torque or power from the prime mover. The output shaft 16 is preferably connected with a final drive unit (not shown) which may include, for example, propshafts, differential assemblies, and drive axles. The input shaft 14 is coupled to and drives the dual clutch assembly 18. The dual clutch assembly 18 preferably includes a pair of selectively engageable torque transmitting devices including a first torque transmitting device 22 and a second torque transmitting device 24. The torque transmitting devices 22, 24 are mutually exclusively engaged to provide drive torque to the gear arrangement 20.

The gear arrangement 20 includes a plurality of gear sets, indicated generally by reference number 26, and a plurality of shafts, indicated generally by reference number 28. The plurality of gear sets 26 includes individual intermeshing gears that are connected to or selectively connectable to the plurality of shafts 28. The plurality of shafts 28 may include layshafts, countershafts, sleeve and center shafts, reverse or idle shafts, or combinations thereof. It should be appreciated that the specific arrangement and number of the gear sets 26 and the specific arrangement and number of the shafts 28 within the transmission 10 may vary without departing from the scope of the present invention.

The gear arrangement 20 further includes a first synchronizer assembly 30A, a second synchronizer assembly 30B, a third synchronizer assembly 30C, and a fourth synchronizer assembly 30D. The synchronizer assemblies 30A-D are operable to selectively couple individual gears within the plurality of gear sets 26 to the plurality of shafts 28. Each synchronizer assembly 30A-D is disposed either adjacent certain single gears or between adjacent pairs of gears within adjacent gear sets 26. Each synchronizer assembly 30A-D, when activated, synchronizes the speed of a gear to that of a shaft and a positive clutch, such as a dog or face clutch. The clutch positively connects or couples the gear to the shaft. The clutch is bi-directionally translated by a shift rail and fork assembly (not shown) within each synchronizer assembly 30A-D.

The transmission also includes a transmission control module 32. The transmission control module 32 is preferably an electronic control device having a preprogrammed digital computer or processor, control logic, memory used to store data, and at least one I/O peripheral. The control logic includes a plurality of logic routines for monitoring, manipulating, and generating data. The transmission control module 32 controls the actuation of the dual clutch assembly 18 and the synchronizer assemblies 30A-D via a hydraulic control system 100 according to the principles of the present invention.

Figure 2A:
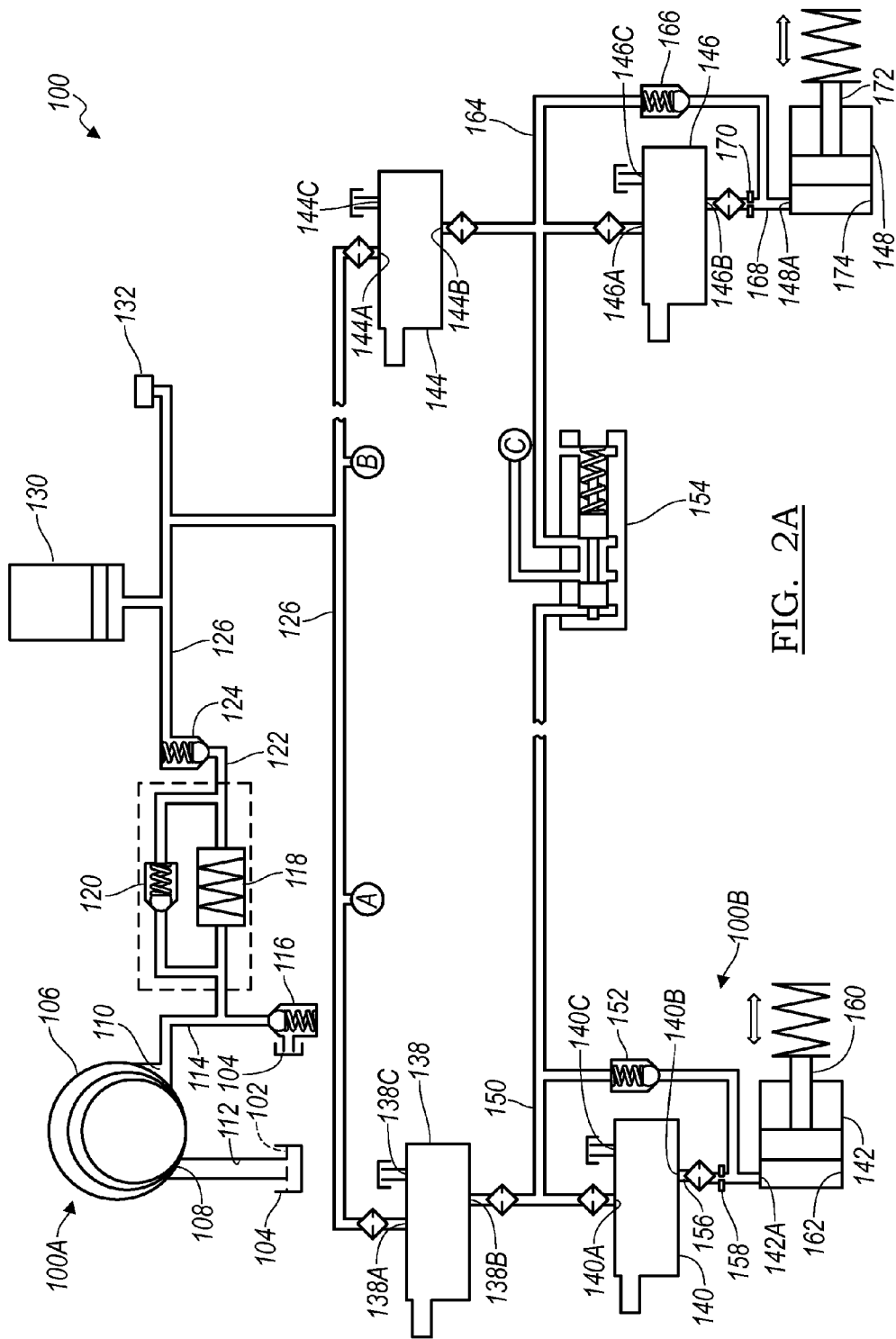
FIG. 2A is a schematic diagram of a first portion of an embodiment of a hydraulic control system for a dual clutch transmission according to the principles of the present invention.
Figure 2B:
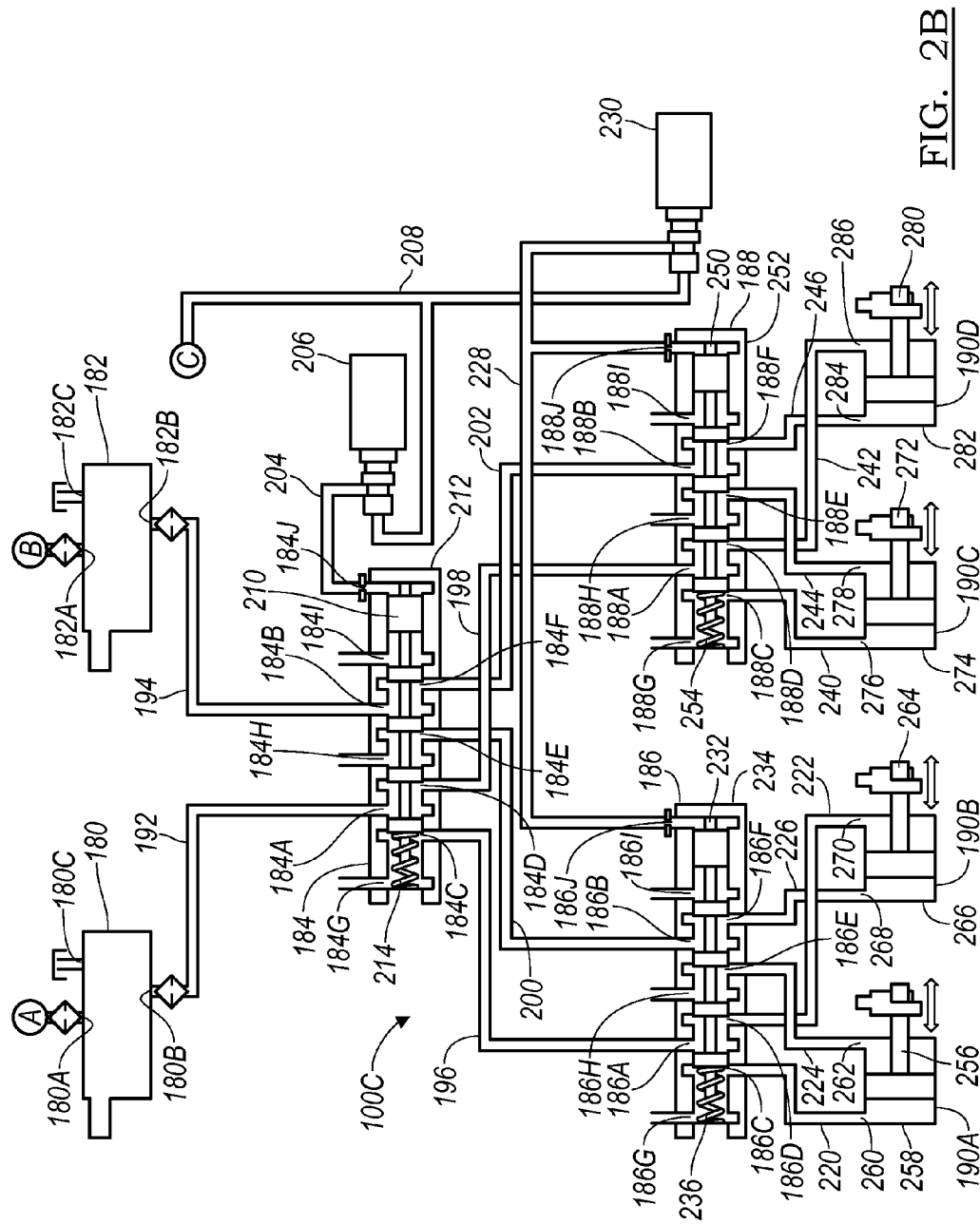
FIG. 2B is a schematic diagram of a second portion of an embodiment of a hydraulic control system for a dual clutch transmission according to the principles of the present invention.

Turning to FIGS. 2A and 2B, the hydraulic control system 100 generally includes three subsystems: an oil or hydraulic fluid delivery subsystem 100A, a clutch control subsystem 100B, and a synchronizer actuator subsystem 100C. The hydraulic control system 100 is operable to selectively engage the dual clutch assembly 18 and the synchronizer assemblies 30A-D by selectively communicating a hydraulic fluid 102 from a sump 104 to a plurality of shift actuating devices, as will be described in detail below. The sump 104 is a tank or reservoir preferably disposed at the bottom of the transmission housing 12 to which the hydraulic fluid 102 returns and collects from various components and regions of the automatic transmission 10. It should be appreciated that in alternative embodiments, various components exhaust hydraulic fluid 102 to an exhaust backfill circuit (not shown) rather than the sump 104. The hydraulic fluid 102 is forced from the sump 104 and communicated throughout the hydraulic control system 100 via a pump 106.

The pump 106 is preferably driven by an electric motor (not shown) and may be, for example, a gear pump, a vane pump, a gerotor pump, or any other positive displacement pump. The pump 106 includes an inlet port 108 and an outlet port 110. The inlet port 108 communicates with the sump 104 via a suction line 112. The outlet port 110 communicates pressurized hydraulic fluid 102 to a supply line 114. The supply line 114 is in communication with a spring biased blow-off safety valve 116, a pressure side filter 118, and a spring biased check valve 120. The spring biased blow-off safety valve 116 communicates with the sump 104. The spring biased blow-off safety valve 116 is set at a relatively high predetermined pressure and if the pressure of the hydraulic fluid 102 in the supply line 114 exceeds this pressure, the safety valve 116 opens momentarily to relieve and reduce the pressure of the hydraulic fluid 102. The pressure side filter 118 is disposed in parallel with the spring biased check valve 120. If the pressure side filter 118 becomes blocked or partially blocked, pressure within supply line 114 increases and opens the spring biased check valve 120 in order to allow the hydraulic fluid 102 to bypass the pressure side filter 118.

The pressure side filter 118 and the spring biased check valve 120 each communicate with an outlet line 122. The outlet line 122 is in communication with a second check valve 124. The second check valve 124 is in communication with a main supply line 126 and is configured to maintain hydraulic pressure within the main supply line 126. The main supply line 126 supplies pressurized hydraulic fluid to an accumulator 130 and a main pressure sensor 132. The accumulator 130 is an energy storage device in which the non-compressible hydraulic fluid 102 is held under pressure by an external source. In the example provided, the accumulator 130 is a spring type or gas filled type accumulator having a spring or compressible gas that provides a compressive force on the hydraulic fluid 102 within the accumulator 130. However, it should be appreciated that the accumulator 130 may be of other types without departing from the scope of the present invention. Accordingly, the accumulator 130 is operable to supply pressurized hydraulic fluid 102 back to the main supply line 126. However, upon discharge of the accumulator 130, the second check valve 124 prevents the pressurized hydraulic fluid 102 from returning to the pump 106. The accumulator 130, when charged, effectively replaces the pump 106 as the source of pressurized hydraulic fluid 102, thereby eliminating the need for the pump 106 to run continuously. The main pressure sensor 132 reads the pressure of the hydraulic fluid 102 within the main supply line 126 in real time and provides this data to the transmission control module 32.

The hydraulic control system 100 further includes a plurality of solenoids and valves that direct the pressurized hydraulic fluid 102 delivered from the pump 106 or accumulator 130 via the main supply line 126 to a plurality of actuation devices that actuate the dual clutch assembly 18 and the synchronizers 30A-D of the clutch control subsystem 100B and the synchronizer actuator subsystem 100C.

The clutch control subsystem 100B includes a first pressure control solenoid 138, a first clutch flow control solenoid 140, a first clutch piston assembly 142, a second pressure control solenoid 144, a second clutch flow control solenoid 146, and a second clutch piston assembly 148. The first pressure control solenoid 138 is preferably an electrically controlled variable force solenoid. The first pressure control solenoid 138 includes an inlet port 138A that communicates with an outlet port 138B when the first pressure control solenoid 138 is activated or energized and includes an exhaust port 138C that communicates with the outlet port 138B when the first pressure control solenoid 138 is inactive or de-energized. Variable activation of the first pressure control solenoid 138 regulates or controls the pressure of the hydraulic fluid 102 as the hydraulic fluid 102 communicates from the inlet port 138A to the outlet port 138B. The inlet port 138A is in communication with the main supply line 126. The outlet port 138B is in communication with a fluid line 150. The exhaust port 138C is in communication with the sump 104 or an exhaust backfill circuit (not shown). In an alternate embodiment, the first pressure control solenoid 138 may be replaced with a feed limit valve and an on/off solenoid.

The fluid line 150 communicates the hydraulic fluid 102 from the first pressure control solenoid 138 to the first clutch flow control solenoid 140, from a first pressure limit control valve 152, and to a switching valve assembly 154. The first clutch flow control solenoid 140 is disposed in series with the first pressure control solenoid 138 and is preferably an electrically controlled variable flow solenoid, but can be a variable force solenoid that is operable to actuate the first torque transmitting device 22, as will be described in detail below. The first clutch flow control solenoid 140 includes an inlet port 140A that communicates with an outlet port 140B when the first clutch flow control solenoid 140 is activated or energized and includes an exhaust port 140C that communicates with the outlet port 140B when the first clutch flow control solenoid 140 is inactive or de-energized. Variable activation of the first clutch flow control solenoid 140 regulates or controls the flow of pressured hydraulic fluid 102 as the hydraulic fluid 102 communicates from the inlet port 140A to the outlet port 140B. The inlet port 140A is in communication with the fluid line 150. The outlet port 140B is in communication with a first clutch supply line 156. The exhaust port 140C is in communication with the sump 104 or an exhaust backfill circuit (not shown). The first pressure limit control valve 152 is disposed in parallel with the first clutch flow control solenoid 140 and is in communication with the first clutch supply line 156. If pressure within the first clutch supply line 156 exceeds the pressure in fluid line 150 plus the first pressure limit control valve 152 spring force, the first pressure limit control valve 152 opens to relieve and reduce the pressure. Therefore, the first pressure limit control valve 152 acts as a secondary exhaust path for the first clutch piston assembly 142 during a quick clutch release or failure of the first clutch flow control solenoid 140.

The first clutch supply line 156 communicates through a flow restriction orifice 158 with an inlet port 142A in the first clutch piston assembly 142. The first clutch piston assembly 142 includes a single acting piston 160 slidably disposed in a cylinder 162. The piston 160 translates under hydraulic pressure to engage the first torque transmitting device 22, shown in FIG. 1. When the first clutch flow control solenoid 140 is activated or energized, pressurized hydraulic fluid 102 is provided to the first clutch supply line 156. The pressurized hydraulic fluid 102 is communicated from the first clutch supply line 156 to the first clutch piston assembly 142 where the pressurized hydraulic fluid 102 translates the piston 160, thereby engaging the first torque transmitting device 22. The position of the piston 160 is communicated to the transmission controller 32 via a clutch position sensor (not shown). When the first clutch flow control solenoid 140 is de-energized, the inlet port 140A is closed and hydraulic fluid from the cylinder 162 passes from the outlet port 140B to the exhaust port 140C and into the sump 104 or an exhaust backfill circuit (not shown), thereby disengaging the first torque transmitting device 22.

Hydraulic fluid in the main supply line 126 is also communicated to the second pressure control solenoid 144. The second pressure control solenoid 144 is preferably an electrically controlled variable force solenoid. The second pressure control solenoid 144 includes an inlet port 144A that communicates with an outlet port 144B when the second pressure control solenoid 144 is activated or energized and includes an exhaust port 144C that communicates with the outlet port 144B when the second pressure control solenoid 144 is inactive or de-energized. Variable activation of the second pressure control solenoid 144 regulates or controls the pressure of the hydraulic fluid 102 as the hydraulic fluid 102 communicates from the inlet port 144A to the outlet port 144B. The inlet port 144A is in communication with the main supply line 126. The outlet port 144B is in communication with a fluid line 164. The exhaust port 144C is in communication with the sump 104 or an exhaust backfill circuit (not shown). In an alternate embodiment, the second pressure control solenoid 144 may be replaced with a feed limit valve and an on/off solenoid.

Fluid line 164 communicates the hydraulic fluid 102 from the second pressure control solenoid 144 to the second clutch flow control solenoid 146, to a second pressure limit control valve 166, and to the switching valve assembly 154. The second clutch flow control solenoid 146 is preferably an electrically controlled variable flow solenoid, but can be a variable force solenoid, that is operable to actuate the second torque transmitting device 24, as will be described in detail below. The second clutch flow control solenoid 146 includes an inlet port 146A that communicates with an outlet port 146B when the second clutch flow control solenoid 146 is activated or energized and includes an exhaust port 146C that communicates with the outlet port 146B when the second clutch flow control solenoid 146 is inactive or de-energized. Variable activation of the second clutch flow control solenoid 146 regulates or controls the pressure of the hydraulic fluid 102 as the hydraulic fluid 102 communicates from the inlet port 146A to the outlet port 146B. The inlet port 146A is in communication with fluid line 164. The outlet port 146B is in communication with a second clutch supply line 168. The exhaust port 146C is in communication with the sump 104 or an exhaust backfill circuit (not shown). The second pressure limit control valve 166 is disposed in parallel with the second clutch flow control solenoid 146 and is in communication with the second clutch supply line 168. If pressure within the second clutch supply line 168 exceeds the pressure in fluid line 164 plus the second pressure limit control valve 166 spring force, the second pressure limit control valve 166 opens to relieve and reduce the pressure. Therefore, the second pressure limit control valve 166 acts as a secondary exhaust path for the second clutch piston assembly 148 during a quick clutch release or failure of the second clutch flow control solenoid 146.

The second clutch supply line 168 communicates through a flow restriction orifice 170 with an inlet port 148A in the second clutch piston assembly 148. The second clutch piston assembly 148 includes a single acting piston 172 slidably disposed in a cylinder 174. The piston 172 translates under hydraulic pressure to engage the second torque transmitting device 24, shown in FIG. 1. When the second clutch flow control solenoid 146 is activated or energized, pressurized hydraulic fluid 102 is provided to the second clutch supply line 168. The pressurized hydraulic fluid 102 is communicated from the second clutch supply line 168 to the second clutch piston assembly 148 where the pressurized hydraulic fluid 102 translates the piston 172, thereby engaging the second torque transmitting device 24. The position of the piston 172 is communicated to the transmission controller 32 via a clutch position sensor (not shown). When the second clutch flow control solenoid 146 is de-energized, the inlet port 146A is closed and hydraulic fluid from the cylinder 174 passes from the outlet port 146B to the exhaust port 146C and into the sump 104 or an exhaust backfill circuit (not shown), thereby disengaging the second torque transmitting device 24.

The synchronizer actuator subsystem 100C includes a first synchronizer pressure or flow control solenoid 180, a second synchronizer pressure or flow control solenoid 182, a first logic valve assembly 184, a second logic valve assembly 186, a third logic valve assembly 188, a first synchronizer actuator 190A, a second synchronizer actuator 190B, a third synchronizer actuator 190C, and a fourth synchronizer actuator 190D.

The main supply line 126 communicates pressurized hydraulic fluid 102 to the first synchronizer pressure or flow control solenoid 180 and the second synchronizer pressure or flow control solenoid 182. More specifically, the first synchronizer pressure or flow control solenoid 180 is preferably an electrically controlled variable force solenoid, but can be a variable flow solenoid. The first synchronizer pressure or flow control solenoid 180 is operable to control the pressure of hydraulic fluid 102 delivered to one side of each of the synchronizer actuators 190A-D, as will be described in detail below. The first synchronizer pressure or flow control solenoid 180 includes an inlet port 180A that communicates with an outlet port 180B when the first synchronizer pressure or flow control solenoid 180 is activated or energized and includes an exhaust port 180C that communicates with the outlet port 180B when the first synchronizer pressure or flow control solenoid 180 is inactive or de-energized. Variable activation of the first synchronizer pressure or flow control solenoid 180 regulates or controls the pressure of the hydraulic fluid 102 as the hydraulic fluid 102 communicates from the inlet port 180A to the outlet port 180B. The inlet port 180A is in communication with the main supply line 126. The outlet port 180B is in communication with a fluid line 192. The exhaust port 180C is in communication with the sump 104 or an exhaust backfill circuit (not shown).

The second synchronizer pressure or flow control solenoid 182 is preferably an electrically controlled variable force solenoid, but can be a variable flow solenoid. The second synchronizer pressure or flow control solenoid 182 is operable to control the pressure or flow of hydraulic fluid 102 delivered to another side of each of the synchronizer actuators 190A-D, as will be described in detail below. The second synchronizer pressure or flow control solenoid 182 includes an inlet port 182A that communicates with an outlet port 182B when the second synchronizer pressure or flow control solenoid 182 is activated or energized and includes an exhaust port 182C that communicates with the outlet port 182B when the second synchronizer pressure or flow control solenoid 182 is inactive or de-energized. Variable activation of the second synchronizer pressure or flow control solenoid 182 regulates or controls the pressure or flow of the hydraulic fluid 102 as the hydraulic fluid 102 communicates from the inlet port 182A to the outlet port 182B. The inlet port 182A is in communication with the main supply line 126. The outlet port 182B is in communication with a fluid line 194. The exhaust port 182C is in communication with the sump 104 or an exhaust backfill circuit (not shown).

The first logic valve assembly 184 is in communication with both the first and second synchronizer pressure or flow control solenoids 180, 182 via the fluid lines 192 and 194. The first logic valve assembly 184 is operable to direct pressurized hydraulic fluid 102 from the first and second synchronizer pressure or flow control solenoids 180, 182 to the second and third logic valve assemblies 186, 188 as will be described in detail below. The first logic valve assembly 184 includes a first inlet port 184A, a second inlet port 184B, a first outlet port 184C, a second outlet port 184D, a third outlet port 184E, a fourth outlet port 184F, exhaust ports 184G-I, and an actuation port 184J. The first inlet port 184A is in communication with fluid line 192. The second inlet port 184B is in communication with fluid line 194. The first outlet port 184C is in communication with a fluid line 196. The second outlet port 184D is in communication with a fluid line 198. The third outlet port 184E is in communication with a fluid line 200. The fourth outlet port 184F is in communication with a fluid line 202. The exhaust ports 184G-I are in communication with the sump 104 or an exhaust backfill circuit (not shown).

The actuation port 184J is in communication with a fluid line 204, which in turn communicates with a first solenoid 206.

The first solenoid 206 is preferably a variable force pressure control solenoid in order to regulate a lower pressure at the head of the valve assembly 184 for reduced leakage. In an alternative embodiment, the solenoid 206 is an electrically controlled on/off solenoid. The first solenoid 206 is operable to control the flow of hydraulic fluid 102 delivered from a supply solenoid line 208 to the fluid line 204. The solenoid supply line 208 in turn communicates with the switching valve assembly 154. The switching valve assembly 154 directs hydraulic fluid flow from either fluid line 150 or fluid line 164 to the solenoid supply line 208. In another embodiment, the switching valve assembly 154 is replaced with a three way check ball valve such that whichever of the fluid lines 150 and 164 delivers a higher pressure of hydraulic fluid 102 to the three way ball check valve communicates the hydraulic fluid 102 to the solenoid supply line 208.

The first logic valve assembly 184 further includes a valve 210 slidably disposed within a bore 212. The valve 210 is moveable between at least two positions by the first solenoid 206. A biasing member 214 acts on an end of the valve 210 to bias the valve 210 to a de-stroked position. When the first solenoid 206 is energized, hydraulic fluid 102 communicates through the switching valve 154 to the first solenoid 206, through the first solenoid 206 to the actuation port 184J and the hydraulic fluid 102 acts on an end of the valve 210 to move the valve 210 to a stroked position against the bias of the biasing member 214. When the first solenoid 206 is de-energized, the biasing member 214 moves the valve 210 to the de-stroked position. When the valve 210 is in the de-stroked position (as shown in FIG. 2B), the first inlet port 184A is in communication with the second outlet port 184D, the second inlet port 184B is in communication with the fourth outlet port 184F, and the first and third outlet ports 184C, 184E are in communication with the exhaust ports 184G and 184H, respectively. Accordingly, when the first solenoid 206 is de-energized and the valve 210 is in the de-stroked position, pressurized hydraulic fluid 102 from the first and second synchronizer pressure or flow control solenoids 180, 182 is communicated to the third logic valve assembly 188. When the valve 210 is in the stroked position, the first inlet port 184A is in communication with the first outlet port 184C, the second inlet port 184B is in communication with the third outlet port 184E, and the second and fourth outlet ports 184D, 184F are in communication with the exhaust ports 184H and 184I, respectively. Therefore, when the first solenoid 206 is energized and the valve 210 is in the stroked position, pressurized hydraulic fluid 102 from the first and second synchronizer pressure or flow control solenoids 180, 182 is communicated to the second logic valve assembly 186.

The second logic valve assembly 186 is operable to direct pressurized hydraulic fluid 102 from the first logic valve assembly 184 to the first synchronizer actuator 190A and to the second synchronizer actuator 190B, as will be described in detail below. The second logic valve assembly 186 includes a first inlet port 186A, a second inlet port 186B, a first outlet port 186C, a second outlet port 186D, a third outlet port 186E, a fourth outlet port 186F, exhaust ports 186G-I, and an actuation port 186J. The first inlet port 186A is in communication with fluid line 196. The second inlet port 186B is in communication with fluid line 200. The first outlet port 186C is in communication with a fluid line 220. The second outlet port 186D is in communication with a fluid line 222. The third outlet port 186E is in communication with a fluid line 224. The fourth outlet port 186F is in communication with a fluid line 226. The exhaust ports 186G-I are in communication with the sump 104 or an exhaust backfill circuit (not shown). The actuation port 186J is in communication with a fluid line 228, which in turn communicates with a second solenoid 230.

The second solenoid 230 is preferably a variable force pressure control solenoid in order to regulate a lower pressure at the head of the mode valves 186, 188 for reduced leakage. In an alternative embodiment, the solenoid 230 is an electrically controlled on/off solenoid. The second solenoid 230 is operable to control the flow of hydraulic fluid 102 delivered from the supply solenoid line 208 to the fluid line 228.

The second logic valve assembly 186 further includes a valve 232 slidably disposed within a bore 234. The valve 232 is moveable between at least two positions by the second solenoid 230. A biasing member 236 acts on an end of the valve 232 to bias the valve 232 to a de-stroked position. When the second solenoid 230 is energized, hydraulic fluid 102 communicates through the switching valve 154 to the second solenoid 230, through the second solenoid 230 to the actuation port 186J and the hydraulic fluid 102 acts on an end of the valve 232 to move the valve 232 to a stroked position against the bias of the biasing member 236. When the second solenoid 230 is de-energized, the biasing member 236 moves the valve 232 to the de-stroked position. When the valve 232 is in the de-stroked position (as shown in FIG. 2B), the first inlet port 186A is in communication with the second outlet port 186D, the second inlet port 186B is in communication with the fourth outlet port 186F, and the first and third outlet ports 186C, 186E are in communication with the exhaust ports 186G and 186H, respectively. Accordingly, when the second solenoid 230 is de-energized and the valve 232 is in the de-stroked position, pressurized hydraulic fluid 102 from the first logic valve assembly 184 is communicated to the second synchronizer actuator 190B via fluid lines 222 and 226. When the valve 232 is in the stroked position, the first inlet port 186A is in communication with the first outlet port 186C, the second inlet port 186B is in communication with the third outlet port 186E, and the second and fourth outlet ports 186D, 186F are in communication with the exhaust ports 186H and 186I, respectively. Therefore, when the second solenoid 230 is energized and the valve 232 is in the stroked position, pressurized hydraulic fluid 102 from the first logic valve assembly 184 is communicated to the first synchronizer actuator 190A via fluid lines 220 and 224.

The third logic valve assembly 188 is operable to direct pressurized hydraulic fluid 102 from the first logic valve assembly 184 to the third synchronizer actuator 190C and to the fourth synchronizer actuator 190D, as will be described in greater detail below. The third logic valve assembly 188 includes a first inlet port 188A, a second inlet port 188B, a first outlet port 188C, a second outlet port 188D, a third outlet port 188E, a fourth outlet port 188F, exhaust ports 188G-I, and an actuation port 188J. The first inlet port 188A is in communication with fluid line 198. The second inlet port 188B is in communication with fluid line 202. The first outlet port 188C is in communication with a fluid line 240. The second outlet port 188D is in communication with a fluid line 242. The third outlet port 188E is in communication with a fluid line 244. The fourth outlet port 188F is in communication with a fluid line 246. The exhaust ports 188G-I are in communication with the sump 104 or an exhaust backfill circuit (not shown). The actuation port 188J is in communication with the fluid line 228.

The third logic valve assembly 188 further includes a valve 250 slidably disposed within a bore 252. The valve 250 is moveable between at least two positions by the second solenoid 230. A biasing member 254 acts on an end of the valve 250 to bias the valve 250 to a de-stroked position. When the second solenoid 230 is energized, hydraulic fluid 102 communicates through the switching valve 154 to the second solenoid 230, through the second solenoid 230 to the actuation port 188J and the hydraulic fluid 102 acts on an end of the valve 250 to move the valve 250 to a stroked position against the bias of the biasing member 254. When the second solenoid 230 is de-energized, the biasing member 254 moves the valve 250 to the de-stroked position. When the valve 250 is in the de-stroked position (as shown in FIG. 2B), the first inlet port 188A is in communication with the second outlet port 188D, the second inlet port 188B is in communication with the fourth outlet port 188F, and the first and third outlet ports 188C, 188E are in communication with the exhaust ports 188G and 188H, respectively. Accordingly, when the second solenoid 230 is de-energized and the valve 250 is in the de-stroked position, pressurized hydraulic fluid 102 from the first logic valve assembly 184 is communicated to the fourth synchronizer actuator 190D via fluid lines 242 and 246. When the valve 250 is in the stroked position, the first inlet port 188A is in communication with the first outlet port 188C, the second inlet port 188B is in communication with the third outlet port 188E, and the second and fourth outlet ports 188D, 188F are in communication with the exhaust ports 188H and 188I, respectively. Therefore, when the second solenoid 230 is energized and the valve 250 is in the stroked position, pressurized hydraulic fluid 102 from the first logic valve assembly 184 is communicated to the third synchronizer actuator 190C via fluid lines 240 and 244.

The synchronizer actuators 190A-D are preferably two-area piston assemblies operable to each engage or actuate a shift rail in a synchronizer assembly, but can be three-area piston assemblies. More specifically, the first synchronizer actuator 190A is operable to actuate the first synchronizer assembly 30A, the second synchronizer actuator 190B is operable to actuate the second synchronizer assembly 30B, the third synchronizer actuator 190C is operable to actuate the third synchronizer assembly 30C, and the fourth synchronizer actuator 190D is operable to actuate the fourth synchronizer assembly 30D.

The first synchronizer actuator 190A includes a piston 256 slidably disposed within a piston housing or cylinder 258. The piston 256 presents two separate areas for pressurized hydraulic fluid to act upon. The piston 256 engages or contacts a finger lever or other shift rail component (not shown) of the first synchronizer assembly 30A. The first synchronizer actuator 190A includes a fluid port 260 that communicates with one end of the piston 256 and a fluid port 262 that communicates with an opposite end of the piston 256. Fluid port 260 is in communication with fluid line 220 and fluid port 262 is in communication with fluid line 224. Accordingly, the pressurized hydraulic fluid 102 communicated from the second logic valve assembly 186 enters the first synchronizer actuator 190A through the fluid ports 260, 262 and contacts the piston 256. The difference in pressure between the hydraulic fluid delivered to fluid port 260 from the first synchronizer pressure or flow control solenoid 180 and the hydraulic fluid delivered to fluid port 262 from the second synchronizer pressure or flow control solenoid 182 moves the piston 256 between various positions. First and second synchronizer pressure or control solenoids 180, 182 are variable force solenoids (VFS) that are direct acting and could be either pressure control or flow control devices. Each position in turn corresponds to a position of the shift rail of the first synchronizer assembly 30A (i.e., engaged left, engaged right, and neutral).

The second synchronizer actuator 190B includes a piston 264 slidably disposed within a piston housing or cylinder 266. The piston 264 presents two separate areas for pressurized hydraulic fluid to act upon. The piston 264 engages or contacts a finger lever or other shift rail component (not shown) of the second synchronizer assembly 30B. The second synchronizer actuator 190B includes a fluid port 268 that communicates with one end of the piston 264 and a fluid port 270 that communicates with an opposite end of the piston 264. Fluid port 268 is in communication with fluid line 226 and fluid port 270 is in communication with fluid line 222. Accordingly, the pressurized hydraulic fluid 102 communicated from the second logic valve assembly 186 enters the second synchronizer actuator 190B through the fluid ports 268, 270 and contacts the piston 264. The difference in pressure between the hydraulic fluid delivered to fluid port 270 from the first synchronizer pressure or flow control solenoid 180 and the hydraulic fluid delivered to fluid port 268 from the second synchronizer pressure or flow control solenoid 182 moves the piston 264 between various positions. Each position in turn corresponds to a position of the shift rail of the second synchronizer assembly 30B (i.e., engaged left, engaged right, and neutral).

The third synchronizer actuator 190C includes a piston 272 slidably disposed within a piston housing or cylinder 274. The piston 272 presents two separate areas for pressurized hydraulic fluid to act upon. The piston 272 engages or contacts a finger lever or other shift rail component (not shown) of the third synchronizer assembly 30C. The third synchronizer actuator 190C includes a fluid port 276 that communicates with one end of the piston 272 and a fluid port 278 that communicates with an opposite end of the piston 272. Fluid port 276 is in communication with fluid line 240 and fluid port 278 is in communication with fluid line 244. Accordingly, the pressurized hydraulic fluid 102 communicated from the third logic valve assembly 188 enters the third synchronizer actuator 190C through the fluid ports 276, 278 and contacts the piston 272. The difference in pressure between the hydraulic fluid delivered to fluid port 276 from the first synchronizer pressure or flow control solenoid 180 and the hydraulic fluid delivered to fluid port 278 from the second synchronizer pressure or flow control solenoid 182 moves the piston 272 between various positions. Each position in turn corresponds to a position of the shift rail of the third synchronizer assembly 30C (i.e., engaged left, engaged right, and neutral).

The fourth synchronizer actuator 190D includes a piston 280 slidably disposed within a piston housing or cylinder 282. The piston 280 presents two separate areas for pressurized hydraulic fluid to act upon. The piston 280 engages or contacts a finger lever or other shift rail component (not shown) of the fourth synchronizer assembly 30D. The fourth synchronizer actuator 190D includes a fluid port 284 that communicates with one end of the piston 280 and a fluid port 286 that communicates with an opposite end of the piston 280. Fluid port 284 is in communication with fluid line 246 and fluid port 286 is in communication with fluid line 242. Accordingly, the pressurized hydraulic fluid 102 communicated from the third logic valve assembly 188 enters the fourth synchronizer actuator 190D through the fluid ports 284, 286 and contacts the piston 280. The difference in pressure between the hydraulic fluid delivered to fluid port 286 from the first synchronizer pressure or flow control solenoid 180 and the hydraulic fluid delivered to fluid port 284 from the second synchronizer pressure or flow control solenoid 182 moves the piston 280 between various positions. Each position in turn corresponds to a position of the shift rail of the fourth synchronizer assembly 30D (i.e., engaged left, engaged right, and neutral).

During general operation of the hydraulic control system 100, the accumulator 130 provides the pressurized hydraulic fluid 102 throughout the system and the pump 106 is employed to charge the accumulator 130. Selection of a particular forward or reverse gear ratio is achieved by selectively actuating one of the torque transmitting devices 22, 24 and selectively actuating one of the synchronizer assemblies 30A-D. It should be appreciated that which synchronizer assembly 30A-D and which torque transmitting device 22, 24 provide which forward or reverse gear ratio may vary without departing from the scope of the present invention. To select a specific gear state, first either the first pressure control solenoid 138 or the second pressure control solenoid 144 are energized such that hydraulic fluid 102 is supplied to the switching valve 154. This allows the solenoids 206 and 230 to be supplied with hydraulic fluid 102 in order to command the correct gear state. Next, synchronizer pressure or flow control solenoids 180 and 182 are selectively engaged to engage the desired gear. Finally, solenoids 140 and 146 are selectively actuated to engage the correct clutch for the selected gear.

To actuate the first synchronizer assembly 30A, the first solenoid 206 is energized to move the first logic valve assembly 184 to the stroked position and the second solenoid 230 is energized to move the second logic valve assembly 186 to the stroked position. In addition, one of the first and second torque transmitting devices 22, 24 are engaged as described above. Bi-directional translation of the first synchronizer assembly 30A is then achieved by selectively energizing the synchronizer pressure or flow control solenoids 180, 182. For example, synchronizer pressure or flow control solenoid 180 is energized to move the first synchronizer actuating assembly 190A and therefore the first synchronizer assembly 30A to a first engaged position, synchronizer pressure or flow control solenoid 182 is energized to move the first synchronizer actuating assembly 190A and therefore the first synchronizer assembly 30A to a second engaged position, and both synchronizer pressure or flow control solenoids 180, 182 are engaged to provide a neutral position.

To actuate the second synchronizer assembly 30B, the first solenoid 206 is energized to move the first logic valve assembly 184 to the stroked position and the second solenoid 230 is de-energized to move the second logic valve assembly 186 to the de-stroked position. In addition, one of the first and second torque transmitting devices 22, 24 are engaged as described above. Bi-directional translation of the second synchronizer assembly 30B is then achieved by selectively energizing the synchronizer pressure or flow control solenoids 180, 182. For example, synchronizer pressure or flow control solenoid 180 is energized to move the second synchronizer actuating assembly 190B and therefore the second synchronizer assembly 30B to a first engaged position, synchronizer pressure or flow control solenoid 182 is energized to move the second synchronizer actuating assembly 190B and therefore the second synchronizer assembly 30B to a second engaged position, and both synchronizer pressure or flow control solenoids 180, 182 are engaged to provide a neutral position.

To actuate the third synchronizer assembly 30C, the first solenoid 206 is de-energized to move the first logic valve assembly 184 to the de-stroked position and the second solenoid 230 is energized to move the third logic valve assembly 188 to the stroked position. In addition, one of the first and second torque transmitting devices 22, 24 are engaged as described above. Bi-directional translation of the third synchronizer assembly 30C is then achieved by selectively energizing the synchronizer pressure or flow control solenoids 180, 182. For example, synchronizer pressure or flow control solenoid 180 is energized to move the third synchronizer actuating assembly 190C and therefore the third synchronizer assembly 30C to a first engaged position, synchronizer pressure or flow control solenoid 182 is energized to move the third synchronizer actuating assembly 190C and therefore the third synchronizer assembly 30C to a second engaged position, and both synchronizer pressure or flow control solenoids 180, 182 are engaged to provide a neutral position.

To actuate the fourth synchronizer assembly 30D, the first solenoid 206 is de-energized to move the first logic valve assembly 184 to the de-stroked position and the second solenoid 230 is de-energized to move the third logic valve assembly 188 to the de-stroked position. In addition, one of the first and second torque transmitting devices 22, 24 are engaged as described above. Bi-directional translation of the fourth synchronizer assembly 30D is then achieved by selectively energizing the synchronizer pressure or flow control solenoids 180, 182. For example, synchronizer pressure or flow control solenoid 180 is energized to move the fourth synchronizer actuating assembly 190D and therefore the fourth synchronizer assembly 30D to a first engaged position, synchronizer pressure or flow control solenoid 182 is energized to move the fourth synchronizer actuating assembly 190D and therefore the fourth synchronizer assembly 30D to a second engaged position, and both synchronizer pressure or flow control solenoids 180, 182 are engaged to provide a neutral position.

To engage or actuate the first torque transmitting device 22, the first pressure control solenoid 138 and the first clutch flow control solenoid 140 are energized. To engage or actuate the second torque transmitting device 24, the second pressure control solenoid 144 and the second clutch flow control solenoid 146 are energized.

Figure 3:
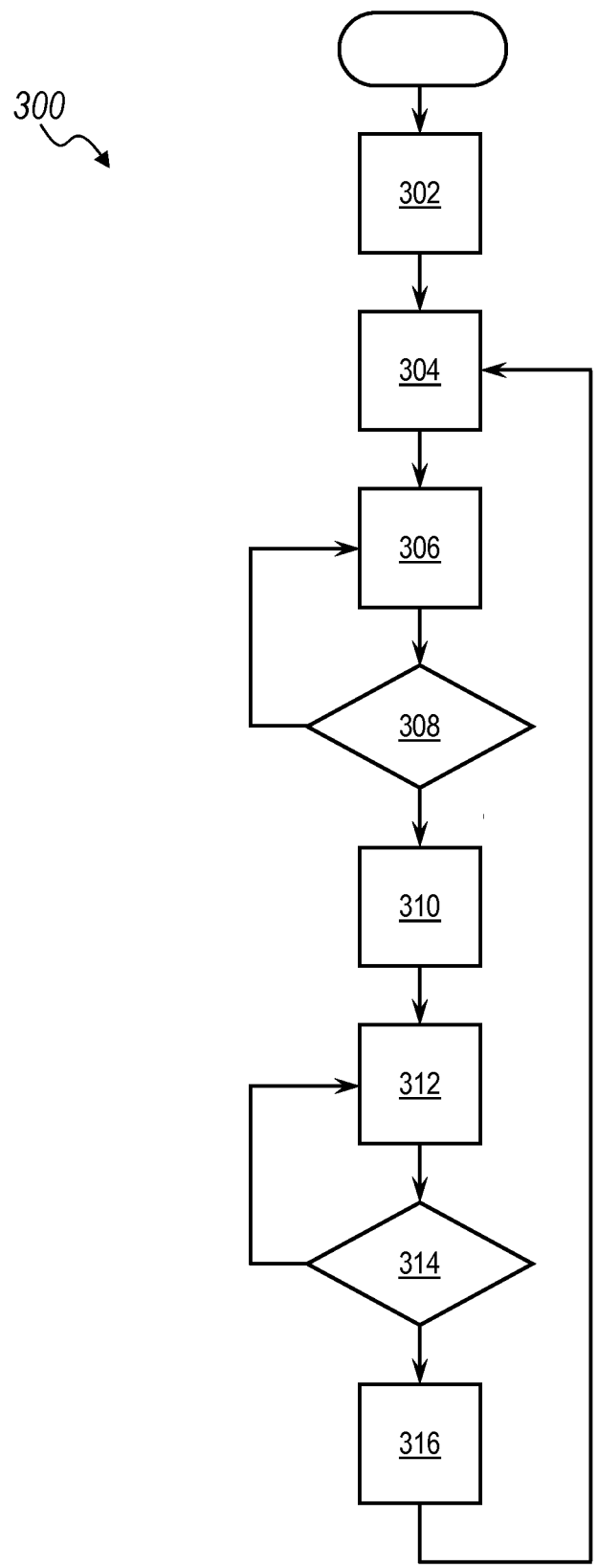
FIG. 3 is a flow chart illustrating a method of controlling a hydraulic fluid delivery subsystem within the hydraulic control system.

Turning to FIG. 3, and with continued reference to FIGS. 1-3, a method for controlling the oil delivery subsystem 100A is generally indicated by reference number 300. Generally, the electrically-driven, fixed displacement pump 106 is used to provide pressurized hydraulic fluid 102 to be used to actuate the clutches 22, 24 and synchronizers 30A-D to make the transmission 10 shift. The hydraulic control system 100 provides this pressurized fluid 102 independent of whether the engine (not shown) is running, thereby keeping the clutches 22, 24 staged for quick response during engine start/stop and other driving requirements. The pump 106 is turned on when the pressure sensor 132 indicates that the accumulator 130 needs to be recharged and is turned off when full charge pressure is achieved.

The method 300 preferably begins after an event such as opening of a car door, unlocking of car doors, engine ignition, seat belt manipulation, or other events that may precede use of the hydraulic control system 100. Prior to initial charging of the hydraulic control system 100, the accumulator 130 is depressurized. Therefore, no reserve hydraulic fluid 102 volume is available in the accumulator 130 to be used by the transmission 10 for shifting. Therefore, the pressure sensor 132 sends a pressure signal to the controller 32 which decides to start the pump 106 at step 302. The pump 106 accelerates to a fixed rpm and operates or runs at step 304 to displace hydraulic fluid 102 from the sump 104, out through the oil filter 118 and check ball 124, and into the accumulator 130 and the rest of the hydraulic control system 100. Pump speed can change throughout the accumulator 130 charge cycle to control noise, motor current, power, pressure rise, and flow rate. This hydraulic fluid 102 builds pressure and charges the accumulator 130, as indicated by line section 305 in FIG. 4.

At step 306, the pressure sensor 132 senses the pressure of the hydraulic fluid 102 within fluid line 126 and therefore within the accumulator 130 and communicates the sensed pressure to the controller 32. At step 308 the sensed pressure is compared to a first threshold value. The first threshold value is a predetermined pressure value indicative of a fully charged accumulator 130, indicated by "P1" in the accumulator pressure versus time graph illustrated in FIG. 4. If the sensed pressure is less than the first threshold value, the method 300 returns to step 306 and the pump 106 continues to run. If the sensed pressure is greater than or equal to the first threshold value P1, the method 300 proceeds to step 310 where the current to the pump 106 is terminated by the controller 32 thereby causing the pump 106 to stop spinning. The hydraulic fluid 102 is pressurized due to the charge in the accumulator 130. The pressurized hydraulic fluid 102 is restricted from flowing back into the pump 106 by the check ball 124, which seats to at least partially seal the pump 106 from the accumulator 130. With the check ball 124 seated, the hydraulic fluid 102 within the accumulator 130 flows to the subsystems 100B and 100C for clutch and synchronizer control.

Figure 4:
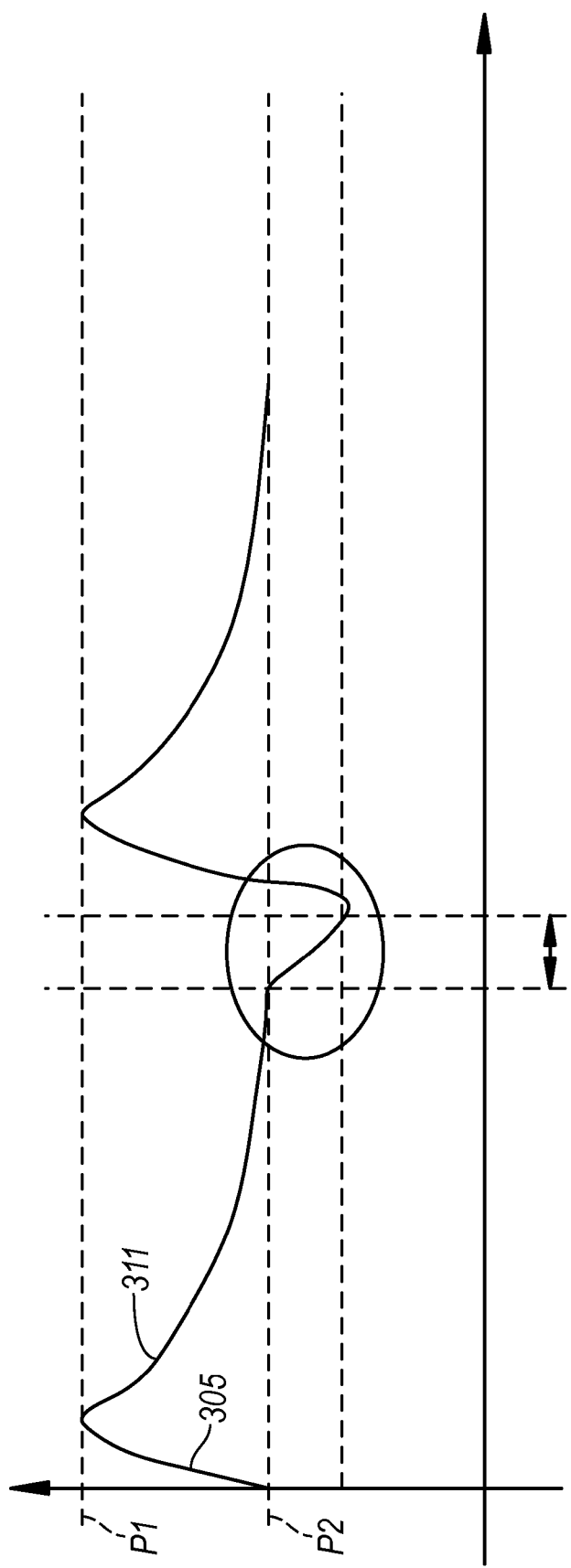
FIG. 4 is a chart illustrating accumulator pressure over time.

Pressure in the accumulator 130, however, decreases over time due to leakage of the subsystems 100B and 100C and the hydraulic fluid 102 volume used to stroke actuators, as indicated by the line section 311 in FIG. 4. At step 312 the pressure sensor 132 senses the pressure of the hydraulic fluid 102 within fluid line 126 and therefore within the accumulator 130 and communicates the sensed pressure to the controller 32.

At step 314 the sensed pressure is compared to a second threshold value. The second threshold value is a calculated pressure value in the accumulator 130 selected to preserve a sufficient accumulator reserve volume to accomplish a number of rapid shifting maneuvers. The second threshold pressure or restart pressure is indicated by "P2" in the accumulator pressure versus time graph illustrated in FIG. 4. To determine the restart pressure P2, the desired reserve volume of hydraulic fluid 102 in the accumulator 130 should first be determined based on the number of shifts, the stroke volumes of the valves, forks, and clutches, the shift times, the rate of system leakage, and the rate of pump output of the transmission 10. The example provided uses a reserve volume of about 21 mL, however other volumes may be used without departing from the scope of the present invention. The second threshold pressure P2 is then calculated as a function of temperature, gas charge pressure in the accumulator 130, capacity of the accumulator 130, pump 106 output flow capabilities, and either learned or assumed leakage and stroke volumes of the valves, forks, and clutches. If the sensed pressure is greater than or equal to the restart pressure P2 then the method 300 returns to step 312 to sense the pressure again while the pump is turned off. If the sensed pressure is less than the restart pressure P2, the method 300 proceeds to step 316 where the current to the pump 106 is activated by the controller 32, thereby causing the pump 106 to restart. The method then returns to step 304 and the cycle continues, as shown in FIG. 4. The blow-off safety valve 116 is designed to unseat and limit the system pressure in the event that the pump 106 does not shut off at the desired time, for example due to a failed pump motor, a failed pressure sensor, or sluggish response. The designed blow-off pressure is slightly above the maximum expected system pressure. For instance if the maximum system pressure is 60 bar, the blow-off will be designed so the nominal pressure may be at 80 bar.

The pump 106 may also run at a fixed lower rpm to create a closed-loop pressure control during some failsafe operation modes where a failed clutch solenoid could result in over pressurization of the clutch 22 or 24. In an alternative embodiment, the pump 106 is additionally turned on during shifting events where relatively large amounts of hydraulic volume are extracted from the accumulator 130.

Figure 5:
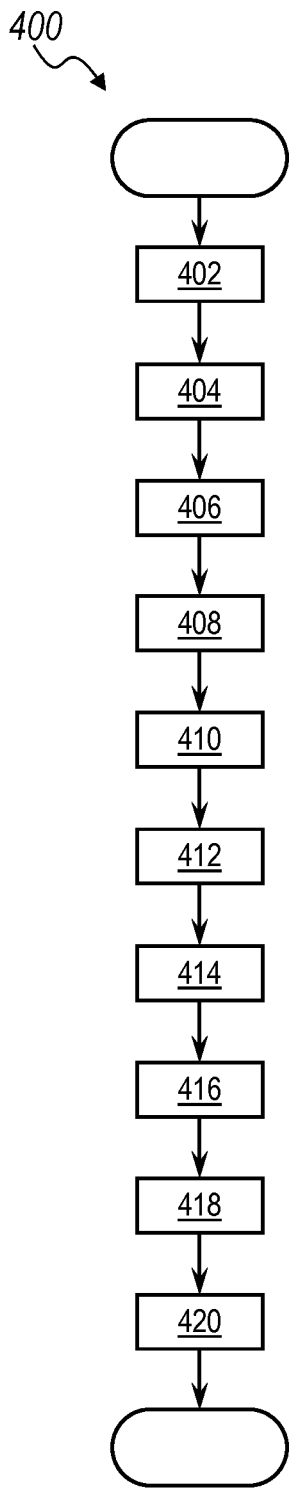
FIG. 5 is a flow chart illustrating a method of controlling a clutch actuator subsystem within the hydraulic control system.

Turning now to FIG. 5, a method for controlling the clutch control subsystem 100B is generally indicated by reference number 400. In this embodiment, the even and odd clutch circuits (i.e. the fluid lines, solenoids, and actuators that control the positions of the clutches 22, 24) are identical but independent.

The method 400 begins at step 402 where the controller 32 determines a target clutch torque for one of the clutches 22, 24. The target clutch torque is an amount of torque required to perform an action within the transmission 10, such as a shift event or maintaining a gear ratio. At step 404 the controller 32 uses a clutch torque to clutch actuator 142, 148 position relationship to determine a target clutch position that will provide the target clutch torque. The clutch torque to clutch actuator 142, 148 position relationship is learned or calibrated as the transmission 10 is operating to adjust for wear or other variables in actuation of the clutch 22, 24. The torque to position relationship is learned by relating the position of the pistons 160, 172 reported by the clutch position sensors to the reported engine torque while the clutches 22, 24 are slipping. The position to torque relationship, once learned, is used to provide a feed-forward control command while shifting. Closed-loop control is also used to fine-tune the relationship between the clutch torque to clutch actuator 142, 148 position relationship.

At step 406 the controller 32 calculates a commanded pressure level of the corresponding pressure control solenoid 138, 144. The commanded pressure level of the pressure control solenoid 138, 144 is calculated from the higher of three pressure requirements: the first pressure requirement is the pressure required to maintain the desired pressure difference across and flow through the corresponding flow control solenoid 140, 146; the second is the pressure level required to provide the target clutch torque in the clutches 22, 24; and the third is the pressure level required to shift the mode valves 184, 186, 188. Pressure level set by pressure control solenoids 138, 144 can be greater than what is needed for torque capacity because the flow control solenoids 140, 146 require a constant pressure drop across the flow control solenoids 140, 146 in order to have a predictable flow rate. Once the commanded pressure level is calculated, the method proceeds to step 408 where the controller 32 sends a current to the pressure control solenoid 138, 144 to provide the commanded pressure level. The current provided is determined at least in part by a performance characteristic of the pressure control solenoid 138, 144 that relates regulated pressure to electrical current through the control solenoid 138, 144. The commanded pressure level establishes an upstream side of a pressure potential across the flow control solenoids 140, 146.

At step 410 the clutch position sensors sense the position of the pistons 160, 172 of the clutch actuators 142, 148 and communicate the current position of the pistons 160, 172 to the controller 32. At step 412 the controller 32 determines the current sent to the flow control solenoids 140, 146 to achieve the targeted clutch position determined in step 404. The controller looks at the actual position vs. target position to calculate flow rate required to obtain target position. At step 414 the controller 32 uses a predetermined clutch actuator 142, 148 position to clutch pressure relationship to estimate a current clutch pressure. At step 416 the controller 32 calculates the pressure potential across the flow control solenoids 140, 146. The pressure potential across the flow control solenoids 140, 146 is calculated by subtracting the current clutch pressure from the commanded pressure level of the pressure control solenoid 138, 144 (i.e. the upstream pressure potential minus the downstream pressure potential).

Once the pressure potential across the flow control solenoids 140, 146 has been determined, at step 418 the controller 32 determines, based on the pressure potential across the flow control solenoids 140, 146, whether to exhaust, maintain, or add pressure to hold a pressure drop across the flow control solenoids 140, 146 to provide predictable flow rates and to position the clutches 22, 24 at the target clutch position determined in step 404 in order to provide the target clutch torque. The pressure potential supplied across the flow control solenoids 140, 146 creates a relationship between an electrical current and a flow rate from the flow control solenoids 140, 146. As described above, the flow control solenoids 140, 146 are capable of both positive (feed) flow, zero flow, and negative (exhaust) flow depending on the value of current commanded. At step 420 the controller 32 commands the proper current on the flow control devices 140, 146 to bring the current clutch position to the target clutch position. Closed loop control may also be used based on actual and commanded piston 160, 172 velocity and position to control the flow control solenoids 140, 146 and achieve the target clutch position. If the clutches 22, 24 are being engaged, flow is positive and larger currents are commanded. If the clutches 22, 24 are being disengaged, flow is negative and lower currents are commanded. There is a region of current in the middle where the flow is deadheaded, neither feeding nor exhausting. The steps 402-420 preferably repeat continuously to ensure that clutches 22, 24 are properly positioned.

The spring loaded check balls of the limit control valves 152, 166 may be provided to allow quick releases of the clutches 22, 24 or to release the clutches 22, 24 in the event of a flow control solenoid 140, 146 sticking in the deadheaded region. The clutches 22, 24 are released through the limit control valves 152, 166 by reducing the pressure control solenoid 138, 144 pressure below the clutch pressure level and check ball threshold.

Figure 6:
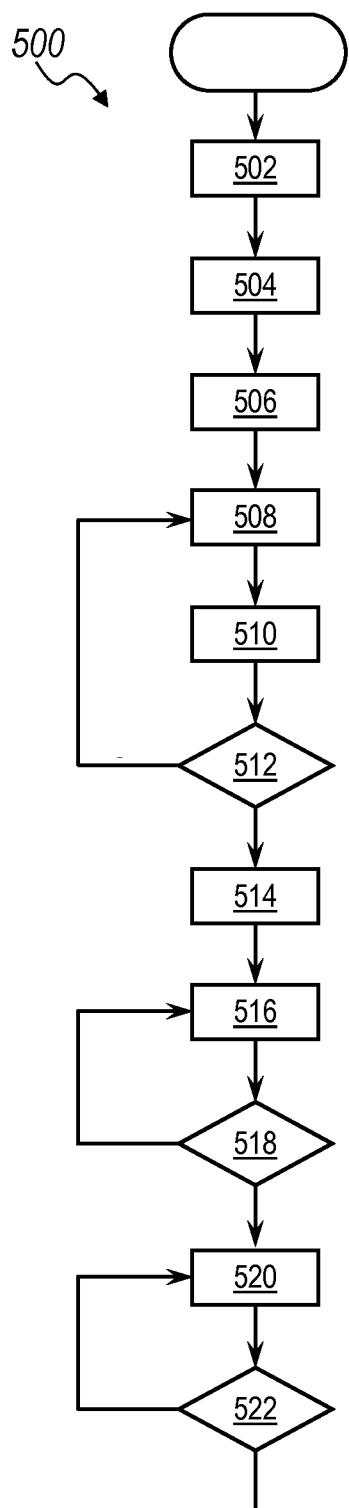
FIG. 6 is a flow chart illustrating a method of controlling a synchronizer actuator subsystem within the hydraulic control system.

Turning now to FIG. 6, a method of controlling the synchronizer control subsystem 100C is generally indicated by reference number 500. The synchronizer control subsystem 100C includes the pressure control solenoids 180, 182, the mode valves 184, 186, 188, the mode valve solenoids 206, 230, and the dual-acting fork actuators 190A-D each with its own position sensor. The pressure control solenoid 180 controls the fluid pressure to one of the fluid ports of an actuator 190A-D and the pressure control solenoid 182 controls the fluid pressure to the other fluid port of the actuator 190A-D. The mode valve 184 is independently controlled by the mode valve solenoid 206 to effectively split the fork control system into two circuits. One circuit may control the actuators 190A-B to engage the odd numbered gears, such as 1st, 3rd, 5th, and 7th gears, for example. The other circuit may control the actuators 190C-D to engage the even numbered gears, such as 2nd, 4th, 6th, and Reverse gears, for example. Each fork actuator 190A-D is dual-acting, meaning that it has a fully-engaged position to the left, a neutral position in the middle, and a fully engaged position to the right. For example, one actuator piston could engage the 3rd gear synchronizer to the left and 5th gear to the right with a neutral position in the middle.

Figure 7:
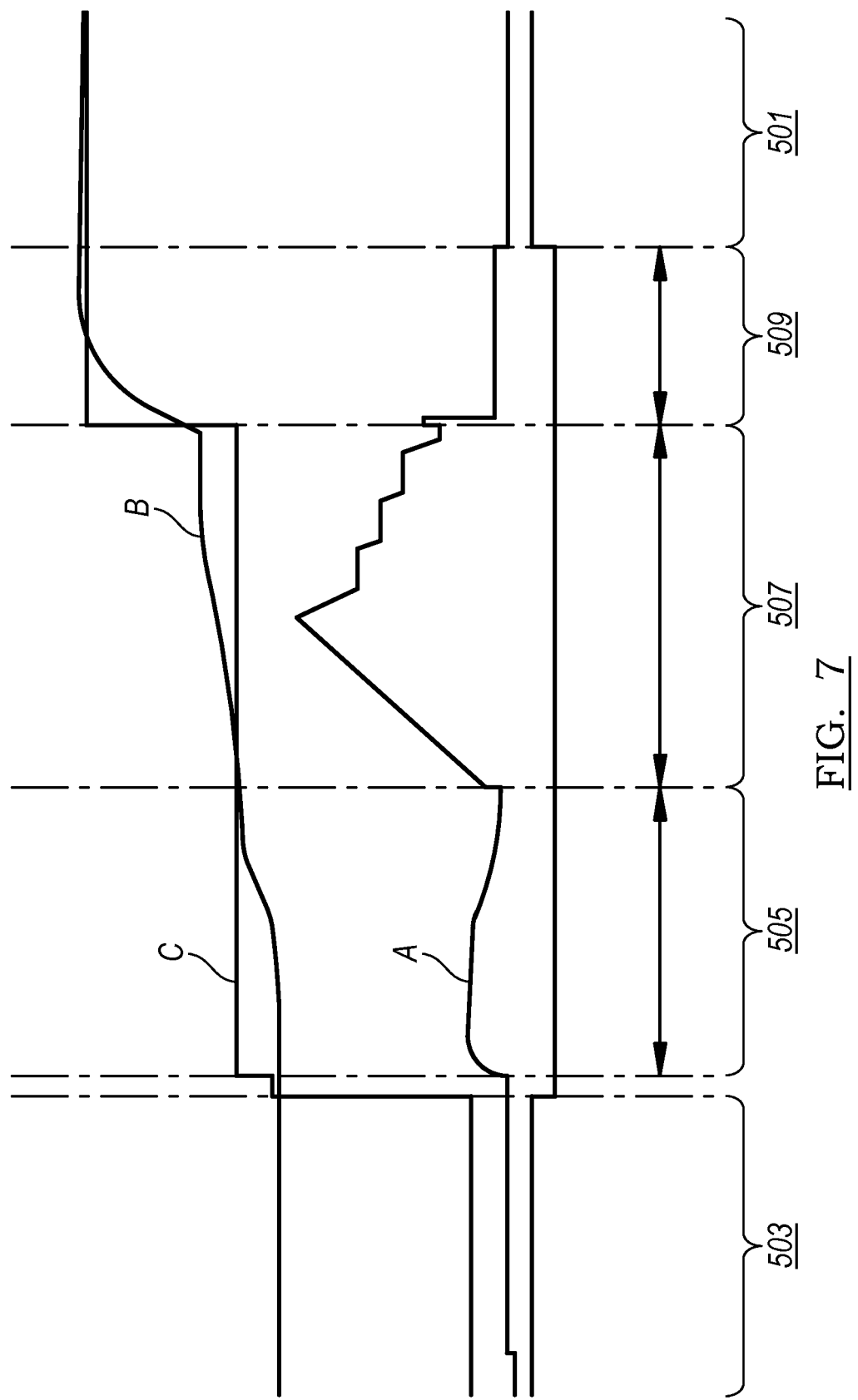
FIG. 7 is a chart illustrating synchronizer controls over time.

The method 500 begins at step 502 where the controller 32 selects a synchronizer 30A-D to be engaged in order to meet the shifting requirements of the motor vehicle. The synchronizers 30A-D operate in different modes, as shown in FIG. 7. The synchronizer modes consist of two steady-state modes and at least three transient modes. The steady-state modes include a fully engaged mode 501 and a neutralized mode or pre-staging 503. Transient modes consist of a pre-synchronized mode 505, a synchronizing mode 507, and post-synchronized mode 509. Moreover, line "A" in FIG. 7 indicates the relative synchronizer force over time, line "B" indicates the actual synchronizer position over time, and line "C" indicates the fork position command over time.

Prior to any synchronizer shifting event, the mode valves 184, 186, 188 must be positioned to connect the pressure control solenoids 180, 182 with the actuator 190A-D that controls the selected synchronizer 30A-D. Accordingly, the method 500 proceeds to step 504 where the controller 32 sends an appropriate electric current command to the first solenoid 206 to select between the circuit controlling actuators 190A-B and the circuit controlling actuators 190C-D. If the current command is high, the solenoid 206 will impart a pressure on the actuation port 184J and the end of the valve 210 of the valve assembly 184. This pressure is sufficient to move the valve 210 against the biasing member 214 to provide hydraulic fluid 102 to the mode valve 188, which in the present example is associated with actuation of the odd numbered gears. If the current command is low, the solenoid 206 will hydraulically connect the actuation port 184J with an exhaust and the biasing member 214 will push the valve 210 to the de-stroked position to provide hydraulic fluid to the mode valve 186, which in the present example is associated with actuation of the even numbered gears.

At step 506 the controller 32 sends an appropriate electric current command to the second solenoid 230 that controls the mode valves 186, 188 to select between the actuators 190A, 190C and the actuators 190B, 190D, in accordance with the position of the mode valve 184. If the current command is high, the solenoid 230 will impart a pressure on the actuation ports 186J, 188J and the end of the valves 232, 250 of the mode valve assemblies 186, 188. This pressure is sufficient to move the valves 232, 250 against the biasing members 236, 254. This will connect the pressure control solenoids 180, 182 with the actuator 190A when the mode valve 184 is stroked and to the actuator 190C when the mode valve 184 is in the de-stroked position. If the current command is low, the solenoid 230 will hydraulically connect the actuation ports 186J, 188J with an exhaust and the biasing members 236, 254 will push the valves 232, 250 to the de-stroked position. This will connect the pressure control solenoids 180, 182 with the actuator 190B when the mode valve 184 is stroked and to the actuator 190D when the mode valve 184 is in the de-stroked position. It should be appreciated that the pairing of the mode valves 184, 186, 188, the actuators 190A-D, and the gear pairing may vary by transmission design without departing from the scope of the present invention.

In the example provided, the hydraulic fluid 102 is supplied to the solenoids 206, 230 and valves 184, 186, 188 by the clutch pressure control solenoids 138, 144 through the switching valve 154. The switching valve 154 toggles between odd and even clutch pressure supply through a pressure balance that is determined by the even clutch assembly 142. When the even clutch assembly 142 is applied, the pressure is high enough that the force generated on the valve of the valve assembly 154 overcomes the biasing spring force, thus moving the valve to the right. With the valve to the right, the pressure control solenoid 138 provides hydraulic fluid 102 to the solenoids 206, 230. When the even clutch assembly 142 is not applied, the spring force is greater than the oil pressure force generated on the supply valve assembly 154, thus moving the valve to the left. With the valve to the left, the pressure control solenoid 144 provides hydraulic fluid 102 to the solenoids 206, 230.

Once the mode valve assemblies 184, 186, 188 have been pre-staged, as shown at 503 in FIG. 7, the method 500 proceeds to step 508. At step 508 the controller 32 calculates the value of electrical current to supply to the pressure control solenoids 180, 182 in order to achieve the desired movement of the actuator piston 256, 264, 272, 280. The pressure control solenoids 180, 182 will provide positive fluid pressures that cause a difference in force across the piston 256, 264, 272, 280. When there is a net force, the piston 256, 264, 272, 280 will move in the direction of the net force and increase the pressure on the opposite side of the piston 256, 264, 272, 280. When this increased actual pressure exceeds the commanded pressure of the solenoid 180, 182, the solenoid 180, 182 blocks off supply pressure at the inlet ports 180A, 182A and directs control pressure at the outlet port 180B, 182B to the exhaust 180C, 182C. It should be appreciated that exhausting for pressure control solenoids can be done through pressure regulation to a lower positive pressure level or to zero pressure. As noted above, the actuator pistons 256, 264, 272, 280 have two opposing areas of different size. The larger area is connected to the output of one of the pressure control solenoids 180, 182 and the smaller area is connected to the other of the pressure control solenoids 180, 182. Therefore, the same pressure provided by each of the pressure control solenoids 180, 182 will exert different forces on the two opposing sides of the pistons 256, 264, 272, 280. The controller 32 uses the areas of the respective sides to determine what pressures to supply to achieve the desired net force on the piston 256, 264, 272, 280. The pressure is calculated to overcome the detent spring and piston drag and accelerate the piston 256, 264, 272, 280 the desired amount, as described below. The controller 32 controls the synchronizer 30A-D movement by use of closed-loop position and velocity feedback from the position sensor of the actuators 190A-D.

At step 510 the controller 32 commands the pressure control solenoids 180, 182 with the electrical currents calculated in step 508. This step 510 begins and continues the pre-sync mode 505. The pre-sync mode 505 consists of moving the actuator piston 256, 264, 272, 280 and fork (not shown) from an initial position until the synchronizer sleeve (not shown) contacts the blocker ring (not shown) in the synchronizer 30A-D. For example, if in steps 508, 510 one of the pistons 256, 264, 272, 280 is desired to move to the right, the connected pressure control solenoids 180,182 are commanded to pressure levels that correspond to a net force to the right on the piston 256, 264, 272, 280. The piston 256, 264, 272, 280 will begin moving to the right when the force exceeds the detent spring load in the actuator and an oil force acting on the other side of the piston. If one of the pistons 256, 264, 272, 280 is desired to move to the left, the connected pressure control solenoids 180,182 are commanded to pressure levels that correspond to a net force to the left on the piston 256, 264, 272, 280. The piston 256, 264, 272, 280 will begin moving to the left when the force exceeds the detent spring load in the actuator and an oil force acting on the other side of the piston.

At step 512 the controller determines whether the piston 256, 264, 272, 280 is approaching a learned position at which synchronization will begin. If the piston 256, 264, 272, 280 is not nearing the learned position, the method returns to step 510. If the piston 256, 264, 272, 280 is approaching the learned position, the method proceeds to step 514 where the pressure commanded by the pressure control solenoid 180, 182 is adjusted to reduce the net force on and slow the velocity of the piston 256, 264, 272, 280. Slowing the velocity of the piston 256, 264, 272, 280 avoids a bump or clunk when synchronizer contact is made.

At step 516 the current sent to the pressure control solenoids 180, 182 is adjusted based on piston position and piston speed feedback from the sensor in the actuator 190A-D. At the beginning of the synchronization mode 507 the actuator force is ramped up to provide a smooth speed change across the synchronizer without any clunks or bumps.

At step 518 the controller 32 determines whether the synchronization mode 507 is nearing the end. If the synchronization mode 507 is not nearing the end, the method returns to step 516. If the synchronization mode 507 is nearing the end, pressure provided by the pressure control solenoid 180, 182 is lowered at step 520 in anticipation of the post-sync mode 509.

At step 522 the controller 32 determines whether the post-sync mode 509 has been signaled. The post-sync mode 509 begins when the blocker ring (not shown) indexes and allows the sleeve (not shown) of the synchronizer 30A-D to move through to full engagement with the gear 26. If the post-sync mode 509 has not been signaled, the method 500 returns to step 520. If the post-sync mode 509 has been signaled, the method proceeds to step 524 where the velocity of the piston 256, 264, 272, 280 is controlled to avoid a clunk when the sleeve (not shown) contacts and stops on the gear 26. The velocity of the piston 256, 264, 272, 280 is controlled with closed-loop position and velocity control wherein pressure levels from the pressure control solenoids 180, 182 are adjusted to achieve the desired force on the piston 256, 264, 272, 280.

At step 526 the controller 32 determines whether the full engagement mode 501 has been signaled. The full engagement mode 501 begins when the sleeve (not shown) contacts and stops on the gear 26 at a final position. If the full engagement mode 501 has not been signaled, the method 500 returns to step 524. If the full engagement mode 501 has been signaled, the method proceeds to step 528 where the pressure from the pressure control solenoid 180, 182 is reduced to zero. Back taper on the synchronizer teeth (not shown) and the detent spring force hold the synchronizer 30A-D in full engagement. Once the full engagement mode 501 is complete the mode valve solenoid 206, 230 pressure is reduced to zero at step 530 in order to conserve leakage at the head of the mode valves 210, 232, 250.

When disengaging the synchronizer 30A-D from full engagement mode 501 back to neutral mode 503, there is only a position and velocity controlled phase. At step 532 the mode valve solenoids 206, 230 are commanded to the appropriate state to couple the pressure control solenoids 180, 182 to the appropriate actuator 190A-D. At step 534 the pressure control solenoids 180, 182 are commanded to pressure levels required to generate the desired net force on the piston 256, 264, 272, 280 to force the piston 256, 264, 272, 280 to move. The position and velocity of the actuator piston 256, 264, 272, 280 is controlled via closed-loop control using the feedback of the position sensor at step 536. As the piston 256, 264, 272, 280 approaches the middle neutral position, the commanded velocity is slowed at step 538. Velocity of actuator piston 256, 264, 272, 280 can be slowed by reducing pressure on pressure control solenoids 180, 182 and by adding pressure to the opposing side of actuator piston 256, 264, 272, 280 from pressure control solenoids 180, 182. Once the piston 256, 264, 272, 280 has reached a region near the learned neutral position, the pressure control solenoids 180, 182 are profiled off. Once the pressure is exhausted on the actuator 190A-D, a mechanical detent spring (not shown) holds the actuator 190A-D in the neutral position. The mode valve solenoids 206, 230 are then commanded to zero pressure to conserve leakage at the head of the mode valves 210, 232, 250 at step 540, and full disengagement is complete.

The components of the hydraulic control system 100 are connected via a plurality of fluid communication lines, as described above. It should be appreciated that the fluid communication lines may be integrated in a valve body or formed from separate tubing or piping without departing from the scope of the present invention. In addition, the fluid communication lines may have any cross sectional shape and may include additional or fewer bends, turns, and branches than illustrated without departing from the scope of the present invention. The valve assemblies described above are illustrated as spool valve assemblies having multiple ports. However, it should be appreciated that other specific types of valves having greater or fewer ports may be provided without departing from the scope of the present invention. Finally, it should be appreciated that the source of pressurized hydraulic fluid, i.e. the pump accumulator 130 and the electrically driven pump 106 may be replaced by alternate hydraulic fluid sources, such as an engine driven pump.

By providing flow control of the clutches 22 and 24 and pressure control of the synchronizer assemblies 30A-D, the hydraulic control system 100 is operable to provide direct clutch position control, direct synchronizer actuator position control, and variable clutch and synchronizer actuator position control. At the same time, quick clutch response times are enabled, spin losses are reduced, and packaging space of the hydraulic control system 100 is reduced, all of which contributes to improved fuel economy and performance. The hydraulic control system 100 is also compatible with BAS/BAS+ hybrid systems. Finally, failure mode protection is enabled through pre-staged position control of the control devices 138, 140, 144, 146, 180, 182, and the valves 184, 186, 188.

The description of the invention is merely exemplary in nature and variations that do not depart from the general essence of the invention are intended to be within the scope of the invention. Such variations are not to be regarded as a departure from the spirit and scope of the invention.

The invention claimed is:

1. A method of controlling a dual clutch and a plurality of synchronizers in a transmission, the method comprising:

selecting an actuator from a plurality of actuators that actuates a synchronizer of one of the plurality of synchronizers or engages a clutch from one of a first and a second clutch of the dual clutch in order to achieve a desired speed ratio in the transmission;

actuating the selected clutch of the dual clutch with a pressurized hydraulic fluid;

commanding a first synchronizer control solenoid to provide a first supply of hydraulic fluid to a first input of a first mode valve, wherein the first synchronizer control solenoid is in downstream fluid communication with a source of pressurized hydraulic fluid;

commanding a second synchronizer control solenoid to provide a second supply of hydraulic fluid to a second input of the first mode valve, wherein the second synchronizer control solenoid is in downstream fluid communication with the source of pressurized hydraulic fluid;

actuating the first mode valve to one of a first position and a second position to direct the first and second supplies of hydraulic fluid to one of a second mode valve and a third mode valve, wherein actuating the first mode valve in the first position directs the first supply of hydraulic fluid from the first input of the first mode valve to a first output of the first mode valve and directs the second supply of hydraulic fluid from the second input of the first mode valve to a third output of the first mode valve, and wherein actuating the first mode valve in the second position directs the first supply of hydraulic fluid from the first input of the first mode valve to a second output of the first mode valve and directs the second supply of hydraulic fluid from the second input of the first mode valve to a fourth output of the first mode valve, and wherein the first output of the first mode valve is in fluid communication with a first input of the second mode valve, the second output of the first mode valve is in fluid communication with a first input of the third mode valve, the third output of the first mode valve is in fluid communication with a second input of the second mode valve, and the fourth output of the first mode valve is in fluid communication with a second input of the third mode valve; and actuating at least one of the first, second, and third mode valves to direct the first and second supplies of hydraulic fluid to the selected actuator to control the position of the actuator, wherein actuating at least one of the first, second, and third mode valves directs the first supply of hydraulic fluid from the first input of the respective mode valve to a first side of the piston of the selected actuator and directs the second supply of hydraulic fluid from the second input of the respective mode valve to the second side of the piston of the selected actuator;

determining a target clutch torque to be provided by the selected clutch, determining a target clutch position of the selected clutch that will provide the target clutch torque using a clutch torque to clutch actuator position relationship, selecting a first pressure of a hydraulic fluid to be provided by a pressure control solenoid from the higher of a pressure required to enable a required amount of flow through the flow control solenoid to actuate the clutch, a pressure required to hold the target clutch torque on the clutch, and a pressure required to shift a mode valve, commanding the pressure control solenoid to provide a third supply of hydraulic fluid at the selected first pressure to establish an upstream side of a pressure potential across a flow control solenoid that is downstream of the pressure control solenoid, sensing a position of the clutch actuator, estimating a second pressure of a fourth supply of hydraulic fluid at the clutch actuator using a predetermined clutch actuator position to clutch pressure relationship, calculating a pressure potential across the flow control solenoid by subtracting the second pressure from the first pressure, wherein the pressure potential across the flow control solenoid creates a relationship between a control signal and a flow rate from the flow control solenoid, determining a flow rate of the third supply of hydraulic fluid to be provided by the flow control solenoid that will position the clutch actuator to the target clutch position, determining a control signal to be sent to the flow control solenoid to provide the flow rate of the third supply of hydraulic fluid, and communicating the control signal to the flow control solenoid to move the clutch actuator to the target clutch position to provide the target clutch torque.

2. The method of claim 1 wherein the plurality of synchronizers are actuated by a first, a second, a third, and a fourth actuator of the plurality of actuators each having a first input and a second input, wherein the first inputs of the first and second actuators are in respective fluid communication with the first and fourth outputs of the second mode valve, the second inputs of the first and second actuators are in respective fluid communication with the third and the second outputs of the second mode valve, the first inputs of the third and fourth actuators are in respective fluid communication with the first and fourth outputs of the third mode valve, and the second inputs of the third and fourth actuators are in respective fluid communication with the third and the second outputs of the third mode valve.

3. The method of claim 1 wherein actuating the selected clutch includes actuating a clutch actuator in downstream fluid communication with a clutch flow control solenoid, the clutch flow control solenoid being in downstream fluid communication with a clutch pressure control solenoid that is in downstream fluid communication with the source of hydraulic fluid.

4. The method of claim 1 wherein actuating the selected clutch includes controlling the pressure of the hydraulic fluid to the selected clutch, calculating a command pressure level for a clutch pressure control solenoid based on a clutch torque to actuator position relationship, estimating the clutch pressure of the selected clutch from the position of the selected clutch to establish a desired pressure required to enable a required amount of flow through the flow control solenoid to actuate the clutch, and applying a command current to the clutch flow control solenoid such that the selected clutch of the dual clutch engages with a desired torque.

5. The method of claim 1 further comprising maintaining the pressure potential across the flow control solenoid by commanding the pressure control solenoid to exhaust, maintain, or provide added pressure to the flow control solenoid.

6. The method of claim 1 wherein the target clutch torque is an amount of torque required to perform an action within the transmission including performing a shift event or maintaining a gear ratio.

7. The method of claim 1 wherein the clutch torque to clutch actuator position relationship is learned as the transmission is operating by relating a engine torque while the clutch is slipping to a position of the clutch actuator.

8. The method of claim 1 further comprising adjusting the clutch torque to clutch actuator position relationship using closed-loop position control.

9. The method of claim 1 wherein sensing the clutch actuator position includes sensing the clutch actuator position using a clutch position sensor.

10. The method of claim 1 further including modulating pressure levels of the first and second supplies of hydraulic fluid to vary a net force on the piston of the selected actuator and adjust the speed of the piston as the actuator actuates a respective synchronizer.

11. The method of claim 10 further including monitoring a position of the selected actuator as the actuator moves from an initial position to a final position, reducing the net force on the piston when the actuator is approaching a first intermediate position in order to reduce a velocity of the actuator, increasing the net force on the piston when the actuator is at the first intermediate position, determining whether the actuator has reached a second intermediate position, decreasing the net force on the piston when the actuator is at the second intermediate position, determining whether the actuator has reached the final position, commanding a zero net force on the piston when the actuator has reached the final position.

12. The method of claim 11 wherein the first intermediate position is the position of the synchronizer where a synchronizer sleeve contacts a blocker ring in the synchronizer.

13. The method of claim 11 wherein the net force is selected to move the actuator to the commanded position in a desired amount of time and to overcome a detent spring and actuator drag.

14. The method of claim 11 wherein the final position is where a synchronizer sleeve contacts and stops on a gear.

15. The method of claim 11 further comprising reducing a pressure of the first and second supplies of hydraulic fluid to zero after the synchronizer is at the final position.

16. The method of claim 11 wherein the commands on the synchronizer control solenoids to vary the net force on the piston are adjusted using actuator position and velocity feedback.

17. A method of synchronizing a shaft to a gear in a transmission of a motor vehicle, the method comprising:
monitoring a position of an actuator configured to move a synchronizer coupled to the shaft;
actuating a first mode valve to one of a first position and a second position to direct a first and a second supply of hydraulic fluid to one of a second mode valve and a third mode valve, wherein actuating the first mode valve in the first position directs the first supply of hydraulic fluid from a first input of the first mode valve to a first output of the first mode valve and directs the second supply of hydraulic fluid from a second input of the first mode valve to a third output of the first mode valve, and wherein actuating the first mode valve in the second position directs the first supply of hydraulic fluid from the first input of the first mode valve to a second output of the first mode valve and directs the second supply of hydraulic fluid from the second input of the first mode valve to a fourth output of the first mode valve, and wherein the first output of the first mode valve is in fluid communication with a first input of the second mode valve, the second output of the first mode valve is in fluid communication with a first input of the third mode valve, the third output of the first mode valve is in fluid communication with a second input of the second mode valve, and the fourth output of the first mode valve is in fluid communication with a second input of the third mode valve;
actuating at least one of the first, second, and third mode valves to direct the first and second supplies of hydraulic fluid to the actuator to control the position of the actuator, wherein actuating at least one of the first, second, and third mode valves directs the first supply of hydraulic fluid from the first input of the at least one of the first, second, and third mode valves to a first side of a piston of the actuator and directs the second supply of hydraulic fluid from the second input of the at least one of the first, second, and third mode valves to the second side of the piston of the actuator; and
commanding a first synchronizer control solenoid to provide a first supply of hydraulic fluid to the first input of a first mode valve, wherein the first synchronizer control solenoid is in downstream fluid communication with a source of pressurized hydraulic fluid;
commanding a second synchronizer control solenoid to provide a second supply of hydraulic fluid to the second input of the first mode valve, wherein the second synchronizer control solenoid is in downstream fluid communication with the source of pressurized hydraulic fluid;
modulating pressure levels of the first and second supplies of hydraulic fluid to vary a net force on the piston of the actuator and adjust the speed of the piston as the actuator actuates the synchronizer;
monitoring a position of the actuator as the actuator moves from an initial position to a final position;
reducing the net force on the piston when a synchronizer sleeve is approaching a blocker ring in the synchronizer in order to reduce a velocity of the actuator;
increasing the net force on the piston when the synchronizer sleeve contacts the blocker ring in the synchronizer;

determining whether the actuator has reached an intermediate position, decreasing the net force on the piston when the actuator is at the intermediate position;

determining whether the synchronizer sleeve has contacted a gear; and commanding a zero net force on the piston when the synchronizer is fully engaged, and wherein the commands on the synchronizer control solenoids to vary the net force on the piston are adjusted using actuator position and velocity feedback.

18. The method of claim 17 wherein selecting the mode for the first mode valve further includes controlling a first mode solenoid to provide hydraulic pressure to control the first mode valve and selecting the mode for the second and third mode valves further includes controlling a second mode solenoid to provide hydraulic pressure to control the second and third mode valves.

\* \* \* \* \*